(12) United States Patent
Leverrier et al.

(10) Patent No.: US 7,267,004 B2
(45) Date of Patent: Sep. 11, 2007

(54) INERTIAL MICROMECHANICAL TUNING-FORK GYROMETER

(75) Inventors: Bertrand Leverrier, Montelier (FR); Jérôme Inglese, Guilherand (FR); Claude Rougeot, Lyons (FR)

(73) Assignee: Thales, Neuilly-sur Seine (FR)

( * ) Notice: Subject to any disclaimer, the term of this patent is extended or adjusted under 35 U.S.C. 154(b) by 0 days.

(21) Appl. No.: 10/959,315

(22) Filed: Oct. 7, 2004

(65) Prior Publication Data

US 2005/0081630 A1    Apr. 21, 2005

(30) Foreign Application Priority Data

Oct. 10, 2003    (FR)    ................................... 03 11901

(51) Int. Cl.
*G01C 19/00*    (2006.01)
*G01C 19/56*    (2006.01)

(52) U.S. Cl. ............................... 73/504.12; 73/504.14; 73/504.16

(58) Field of Classification Search ............. 73/504.02, 73/504.04, 504.12, 504.14, 504.16, 514.32
See application file for complete search history.

(56) References Cited

U.S. PATENT DOCUMENTS

| | | | | |
|---|---|---|---|---|
| 5,635,638 A | * | 6/1997 | Geen | 73/504.04 |
| 5,706,252 A | | 1/1998 | Le Verrier et al. | |
| 5,721,377 A | * | 2/1998 | Kurle et al. | 73/504.12 |
| 5,728,936 A | * | 3/1998 | Lutz | 73/504.14 |
| 6,214,243 B1 | * | 4/2001 | Muenzel et al. | 216/2 |
| 6,257,059 B1 | * | 7/2001 | Weinberg et al. | 73/504.16 |
| 6,282,955 B1 | | 9/2001 | Hulsing, II | |
| 6,378,369 B1 | * | 4/2002 | Takata et al. | 73/504.14 |
| 6,467,348 B1 | * | 10/2002 | Song et al. | 73/504.12 |
| 6,647,759 B2 | | 11/2003 | Leverrier et al. | |
| 6,742,389 B2 | * | 6/2004 | Nguyen et al. | 73/504.12 |
| 6,761,068 B1 | * | 7/2004 | Schmid | 73/504.14 |
| 6,939,473 B2 | * | 9/2005 | Nasiri et al. | 216/2 |
| 2004/0250620 A1 | * | 12/2004 | Nicu et al. | 73/504.12 |

FOREIGN PATENT DOCUMENTS

FR    2834055 A    6/2003
WO    01/22094 A    3/2001

* cited by examiner

*Primary Examiner*—Helen Kwok
(74) *Attorney, Agent, or Firm*—Lowe Hauptman Ham & Berner, LLP (57) ABSTRACT

The invention relates to a micromachined gyrometer having a planar moving structure anchored on a fixed substrate by anchoring feet, the fixed substrate being mounted on a support substrate via fasteners, the moving structure comprising at least two moving assemblies that are symmetrical with respect to an axis of symmetry A1; the anchoring feet are located outside this axis A1. The fixed substrate has etched features for the purpose of partly isolating at least one region from the rest of the fixed substrate, this region having a portion of the fixed substrate that includes at least one anchoring foot, and the fixed substrate is mounted on the support substrate via fasteners applied outside the region.

11 Claims, 6 Drawing Sheets

FIG.8

INERTIAL MICROMECHANICAL TUNING-FORK GYROMETER

FIELD OF THE INVENTION

The field of the invention is that of microgyrometers intended for measuring angular velocities.

The use of microgyrometers is continuing to grow, especially in the fields of aeronautics, automobiles and robotics, and in yet other fields, thanks to the fact that at the present time such microsensors have succeeded in combining their robustness with the advantages resulting from their extremely small size. To this may be added the fact that these microgyrometers can be fabricated collectively (i.e. fabrication operations carried out on entire wafers for producing multiple gyrometers that are subsequently divided up into individual gyrometers), thereby making the fabrication cost competitive with the prior devices.

Figure 1:
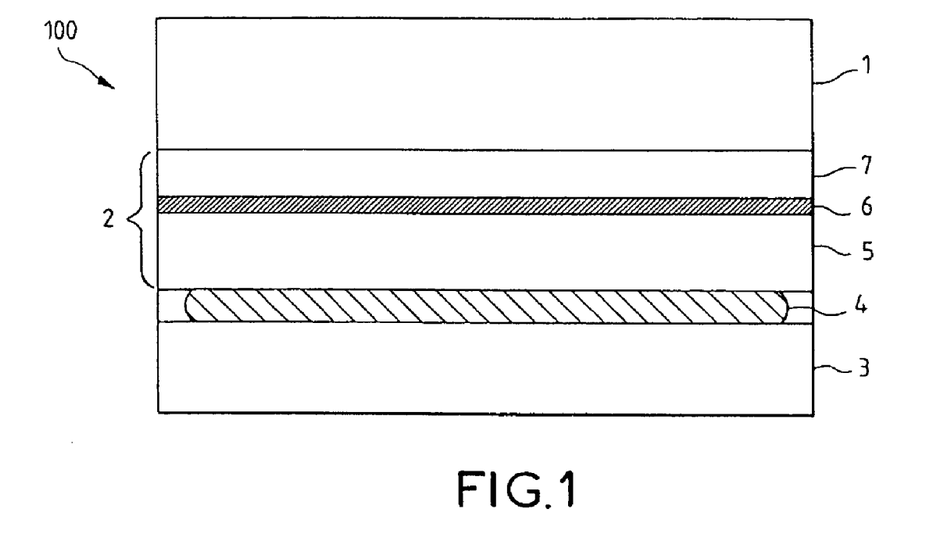
FIG. 1, already described, shows a sectional view of an inertial sensor produced from a superposition of substrates.

It will be recalled that an inertial microgyrometer 100 may be produced from a superposition of three micromachined substrates shown schematically in FIG. 1, which may be three silicon substrates. The first and third substrates, referenced 1 and 3 respectively, serve as covers for a closed chamber in which it is preferred to create a vacuum, while the second substrate 2, or intermediate substrate, is machined to produce a moving structure having the desired mechanical properties. The first substrate may also serve to bring into the second substrate electrical currents for exciting the structure that can move parallel to the plane of the substrates, and may, thanks to electrodes placed facing the moving structure of the intermediate substrate, serve to support circuits for detecting the movements of the moving structure perpendicular to the plane of the substrates. The third substrate is connected to a system for processing the measured data.

BACKGROUND OF THE INVENTION

The first and third substrates may be produced using microelectronic techniques, with operations involving diffusion, deposition of metal layers, and etching of these layers. The intermediate substrate is also produced with these type of operations, but in addition, given that its main function is mechanical, it is produced by deep etching operations for the purpose of cutting out a micromechanical structure with very fine features and very small thicknesses.

Typically, the machining of the moving structure may be carried out using, as intermediate substrate 2, a silicon-on-insulator (SOI) substrate, but other methods are also possible. A silicon-on-insulator substrate consists of a fixed monolithic silicon substrate 5 a few hundred microns in thickness, which carries on its front face a thin silicon oxide layer 6 covered with a single-crystal silicon layer 7 a few tens of microns in thickness. The machining consists in etching the single-crystal silicon 7 via its front face until the oxide layer is reached, using a selective etchant that etches the silicon without significantly etching the oxide. The etching is stopped when the oxide layer 6 is bared. This oxide layer 6 may itself be removed by selective etching with another etchant so as to preserve only the surface silicon layer 7. This may be then be etched into the desired surface patterns by means of photoetching techniques commonly used in microelectronics, in order thus to obtain the desired moving planar structure.

Given that the moving planar structure does not "float" relative to the body of the gyrometer, that is to say relative to the fixed monolithic silicon substrate 5, it is necessary for it to be anchored to the monolithic substrate at anchoring points that do not disturb the mobility of the moving planar structure.

In the rest of the description, the term "anchoring feet" will denote the points for anchoring the elements set in movement by the forces that depend on the angular velocity to be measured, the term "anchoring point" corresponding to the excitation elements. When, as will be seen later, the excitation elements for exciting the structure are also set in movement by the forces that depend on the angular velocity to be measured the term "anchoring foot" will apply instead.

The intermediate substrate 2 is fastened to the third substrate 3, for example by means of a polymeric adhesive 4 or by a fusion-bonded joint uniformly distributed between the fixed monolithic substrate 5 and the third substrate 3. This third substrate 3 will also be called the "support substrate".

The gyrometer 100 is intended to be placed on board an aircraft, a moving vehicle or, more generally, on board a moving system.

It will firstly be recalled that the structure of a high-performance gyrometer produced using these techniques generally comprises two moving masses that are excited in vibration and connected as a tuning fork, that is to say the two masses are connected to a central coupling structure that transfers the vibration energy from the first mass to the second mass, and vice versa.

The masses are excited in vibration in the plane of the structure by electrostatic forces applied via interdigitated electrode combs. This vibration in the plane of the structure is exerted perpendicular to an axis called the "sensitive axis" of the gyrometer, perpendicular to the direction of this vibration. When the gyrometer rotates at a certain angular velocity about its sensitive axis, the composition of the forced vibration with the angular rotation vector generates, by the Coriolis effect, forces that set the moving masses into natural vibration perpendicular to the excitation vibration and to the axis of rotation; the amplitude of this natural vibration is proportional to the speed of rotation. The two masses vibrate in phase opposition so as to obtain a tuning-fork effect.

The natural vibration is detected by an electrical detection structure. The electrical signals that result therefrom are used to deduce from them a value of the angular velocity about the sensitive axis.

In certain cases the sensitive axis lies in the plane of the wafer and the detection structure detects a movement perpendicular to the plane of the moving masses. In other cases, the sensitive axis of the gyrometer is the axis Oz perpendicular to the plane of the wafer. The excitation movement of the moving masses is generated in a direction Ox of the plane, while a movement resulting from the Coriolis force is detected in a direction Oy, perpendicular to Ox, in the same plane.

On a true tuning fork, the vibrating structure is fastened to the external environment via a single point, which is a vibration node of the vibrating structure. This allows the vibration energy to be confined within the vibrating structure and thus makes it possible to achieve high quality factors.

On a planar substrate, the vibrating structure is in general fastened by several distant anchoring feet. However, these anchoring feet are not always vibration nodes of the vibrating structure, so that some of the vibratory energy is transmitted to the external environment via the substrate.

One important objective of the invention is therefore to prevent this loss of energy so as to improve the tuning-fork effect.

SUMMARY OF THE INVENTION

To achieve this objective, the invention proposes a micromachined gyrometer having a planar moving structure anchored on a fixed substrate by anchoring feet, the fixed substrate being mounted on a support substrate by fastening means, the moving structure comprising at least two moving assemblies that are symmetrical with respect to an axis of symmetry A1 contained in this plane and are coupled by a coupling structure that connects these two assemblies in order to allow transfer of mechanical vibration energy between them, the anchoring feet being located outside this axis of symmetry A1. This gyrometer is mainly distinguished by the fact that the fixed substrate has etched features for partly isolating at least one region from the rest of the fixed substrate, this region having a portion of the fixed substrate that includes at least one anchoring foot, and by the fact that the fixed substrate is mounted on the support substrate by fastening means applied outside the region.

Preferably, the region furthermore includes a portion of the fixed substrate, lying along the axis A1, this portion being connected to the portion having at least one anchoring foot.

In practice, the fastening means are applied to the edges of the fixed substrate.

Thus, by partly isolating the anchoring feet from the edges of the fixed substrate, the energy losses of the moving structure are reduced, these losses passing via the anchoring feet, and the tuning-fork effect of the structure, that is to say among other things the quality factor of the resonator, is consequently improved.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other features and advantages of the invention will become apparent on reading the detailed description that follows, given by way of nonlimiting example and with reference to the appended schematic drawings in which.

An example of a gyrometer according to the invention will now be described with reference to FIG. 2.

In the rest of the description, on going from one figure to another the same elements will be denoted by the same references.

Figure 2:
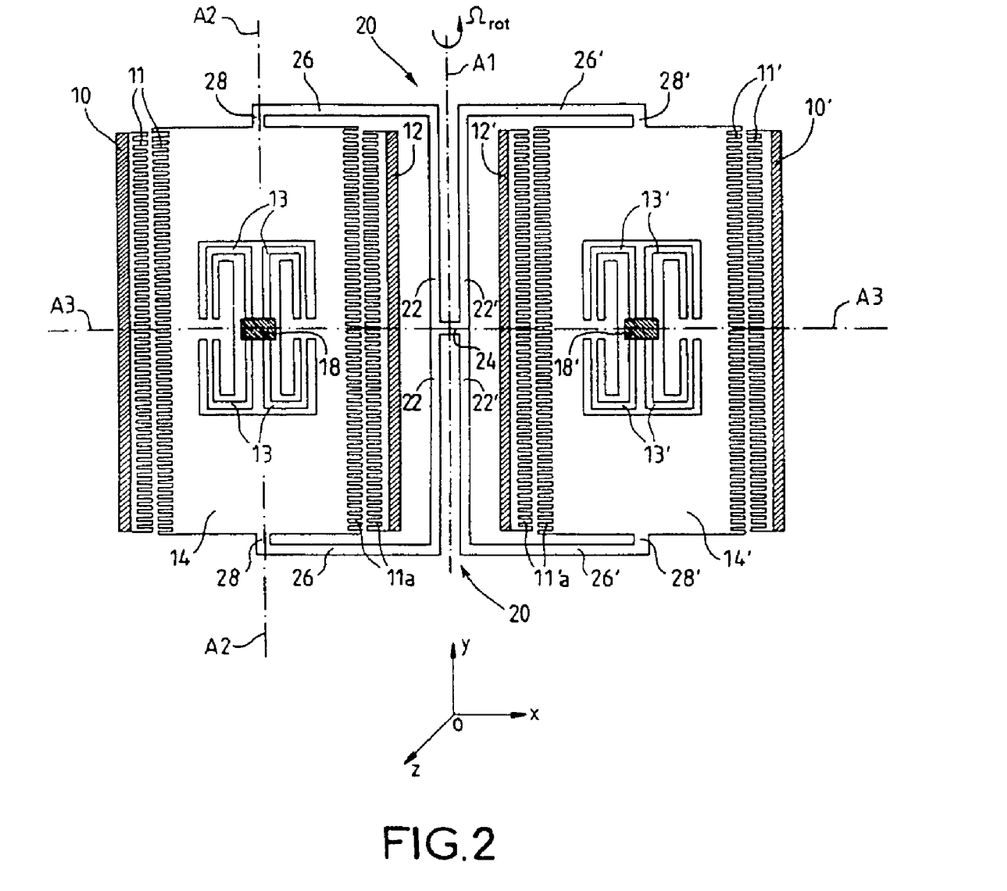
FIG. 2 shows an example of a known gyrometer.

FIG. 2 shows that the general arrangement of the planar moving structure is symmetrical with respect to a first axis A1 (this being oriented in the Oy direction in the orthogonal coordinate system of FIG. 2). The gyrometer delivers an electrical measurement of the angular rotation velocity of the structure about this axis A1. For example, if the gyrometer is set in an aircraft so as to have its axis A1 along the longitudinal axis of the aircraft, the gyrometer will measure the roll velocities of the aircraft.

Since the vibrating planar structure is symmetrical, the same reference, but with a "prime" index, is used to the right of the axis A1 to denote an element that is symmetrical with an element of the left-hand part. The explanations will be given in general with regard to the left-hand part and will not be repeated with regard to the right-hand part where this is unnecessary.

The planar structure comprises two vibrating moving masses denoted by 14, 14'. Each mass is supported by four flexure arms 13, 13'. The flexure arms 13 are attached to the moving mass on one side, and to a fixed anchoring foot on the other.

The present invention is illustrated by way of example, and not by limitation, in the figures of the accompanying drawings, wherein elements having the same reference numeral designations represent like elements throughout and wherein:

DETAILED DESCRIPTION OF THE EMBODIMENT

Moreover, the flexure arms 13 each preferably have a folded shape in the form of a U. One of the branches of the U is fastened, at its end, to the anchoring foot, the other branch being fastened, at its end, to the moving mass 14. The branches are oriented longitudinally, that is to say parallel to the axis A1.

There are four flexure arms 13 for each moving mass. The assembly comprising the moving mass and the four flexure arms is constructed preferably symmetrically with respect to a second axis A2, which is parallel to the axis A1. In practice, the assembly comprising the moving mass and the four flexure arms is also symmetrical with respect to a third axis A3, perpendicular to the axis A1.

The anchoring foot, denoted by 18 in FIG. 2, is then preferably common to the four flexure arms and it is located at the center of gravity of the moving mass, which is itself located at the intersection of the axes of symmetry A2 and A3.

During the etching of the thinned silicon wafer, a space is therefore reserved at the center of the moving mass in order to cut therein the four U-shaped flexure arms, the actual moving mass surrounding these four arms and the anchoring foot 18.

The link between the flexure arms and the moving mass, or between the flexure arms and the anchoring foot, is of the "embedded beam" type.

The use of bent-over arms as flexure arms helps to overcome nonlinearity effects thanks to the very high mechanical flexibility specific to this shape, both in the plane and perpendicular to the plane. These arms allow any stresses intrinsic to the constituent materials to be relaxed.

In the outermost region of the structure, that is to say in the part furthest away from the axis A1, there is an interdigitated comb 11 serving to excite a vibration of the moving mass in the plane of the structure (Ox direction relative to the orthogonal coordinate system drawn in the figure). The excitation comb 11 comprises two facing half-combs, one carried by the moving mass and the other anchored by an anchoring point 10 to the body of the gyrometer. The fingers of one of the half-combs are electrodes that penetrate into the gaps between the electrode fingers of the other half-comb. Applying alternating voltages between the half-combs, at a frequency close or equal to the mechanical resonance frequency of the structure, generates a vibration of the moving mass in the plane of the structure.

The half-combs are shown schematically in all the figures as if they were juxtaposed, but it should be understood that they interpenetrate.

On the inside of the vibrating structure, that is to say on the side close to the sensitive axis, another interdigitated comb 11a is provided, with a half-comb carried by the moving mass and a half-comb anchored by an anchoring point 12 on the body of the gyrometer. This comb serves for detecting the excitation vibration of the mass in the plane of the structure. The benefit of this detection is that it makes it possible to electronically enslave the frequency and the amplitude of excitation of the external comb 11 in order to adjust it to the mechanical resonance frequency of the structure. This is because it is necessary to maximize the amplitude of the vibration in order to increase the sensitivity of the gyrometer, and this maximization assumes that the excitation frequency is well tuned to the mechanical resonance frequency.

The flexure arms 13 support the moving mass, permitting a vibration movement of relatively large amplitude (a few microns). They must also permit a vibration movement of the mass perpendicular to the plane since it is this movement that it is desired to detect. They serve as restoring springs for these two movements and their stiffness must be high enough to exert this restoring force.

Throughout the following, the term "transverse" will be used for orientations perpendicular to the sensitive axis (in the plane of the structure) and the term "longitudinal" for orientations parallel to the sensitive axis.

Given that the vibrating planar structure cannot "float" relative to the body of the gyrometer, it is anchored at anchoring feet.

However, it should be noted that the anchoring feet are a drawback in that some of the mechanical vibration energy of a mass is transmitted (and consequently lost) to the anchoring feet instead of being transmitted to the other mass.

The coupling structure is attached directly to the moving mass without passing through the flexure arms.

The coupling structure, for coupling between the masses, of FIG. 2 essentially comprises a H-shaped part with two longitudinal links 22, 22', a transverse link 24 between the longitudinal links, and elements for linking the masses at the end of the longitudinal links, said linking elements being denoted by 26, 28 in the case of the first mass and 26', 28' in the case of the second.

More precisely, the longitudinal links 22, 22' extend along the longitudinal axis of symmetry A1 and in the immediate vicinity of the latter, over the entire length of the moving masses. A short transverse link 24 connects them together. This link is preferably along the transverse axis of symmetry A3. All the mechanical vibration energy of the masses passes via this transverse link 24, which acts as the foot of a tuning fork, but this foot is not anchored into the body of the gyrometer. It serves to transmit a vibration energy from one mass to the other mass, in the same manner that one branch of a musical tuning fork, struck in order to set it into vibration, automatically generates, by mechanical energy coupling through the foot of the tuning fork, a vibration of the other branch. This coupling is useful in order to ensure that the vibrations of the two moving masses are in phase, it being understood that it is difficult to precisely synchronize these phases by the purely electrical means that the excitation combs constitute.

At the end of the longitudinal link 22, on either side of the moving mass, that is to say on either side of the transverse axis of symmetry A3, there are the elements for linking the mass. These elements comprise, both above the mass 14 and below it, a transverse arm 26 on each side of the mass and a short longitudinal arm 28 serving for attachment between the mass and the transverse arm 26. The short longitudinal arms 28 preferably lie on the second longitudinal axis of symmetry A2. However, the moving mass could if necessary be linked at two points on each transverse arm 26 via two short longitudinal arms 28 symmetrical with respect to the axis A2.

Of course, the elements 26', 28' for linking the other moving mass to the end of the longitudinal links 22' are strictly symmetrical with the elements 26, 28.

In the example shown in FIG. 2, the coupling structure 20 is not fastened, either directly or indirectly, to an anchoring foot.

According to the invention, the fixed substrate includes etched features that define two regions facing the anchoring feet present on the front face of the substrate, and the fixed substrate is mounted on the support substrate via fastening means located at predetermined positions such that little or no vibration energy of the masses, which passes through these anchoring feet, passes through these fastening means.

One simple solution to achieve this consists in partly isolating the anchoring feet from the edges of the fixed substrate and in placing the fastening means on the edges of the fixed substrate. By thus partly isolating the anchoring feet from these fastening means, the energy losses of the moving structure are reduced, these losses passing through the anchoring feet, and the tuning-fork effect of the structure, that is to say among other things the quality factor of the resonator, is consequently improved.

One embodiment of the invention will now be described in relation to FIGS. 3 and 4.

Figure 3:
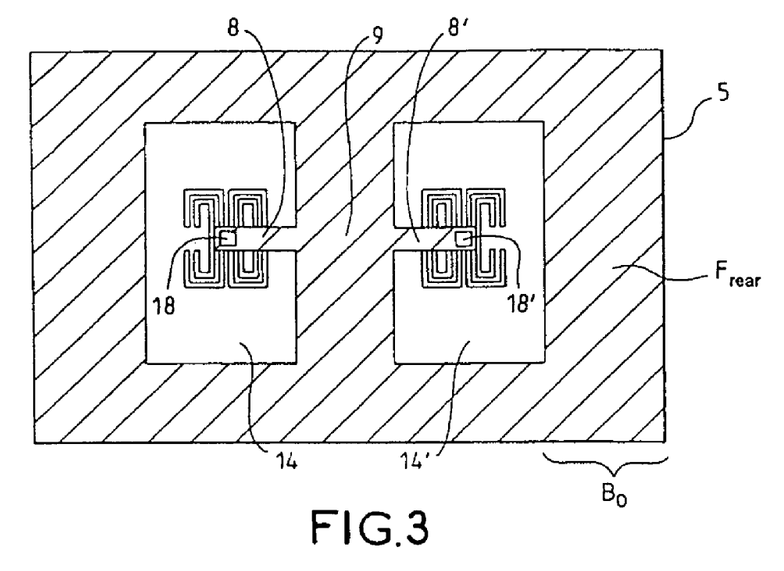
FIG. 3 shows schematically, according to the invention, the fixed substrate corresponding to the moving structure of FIG. 2 seen via its rear face $F_{rear}$.
Figure 5:
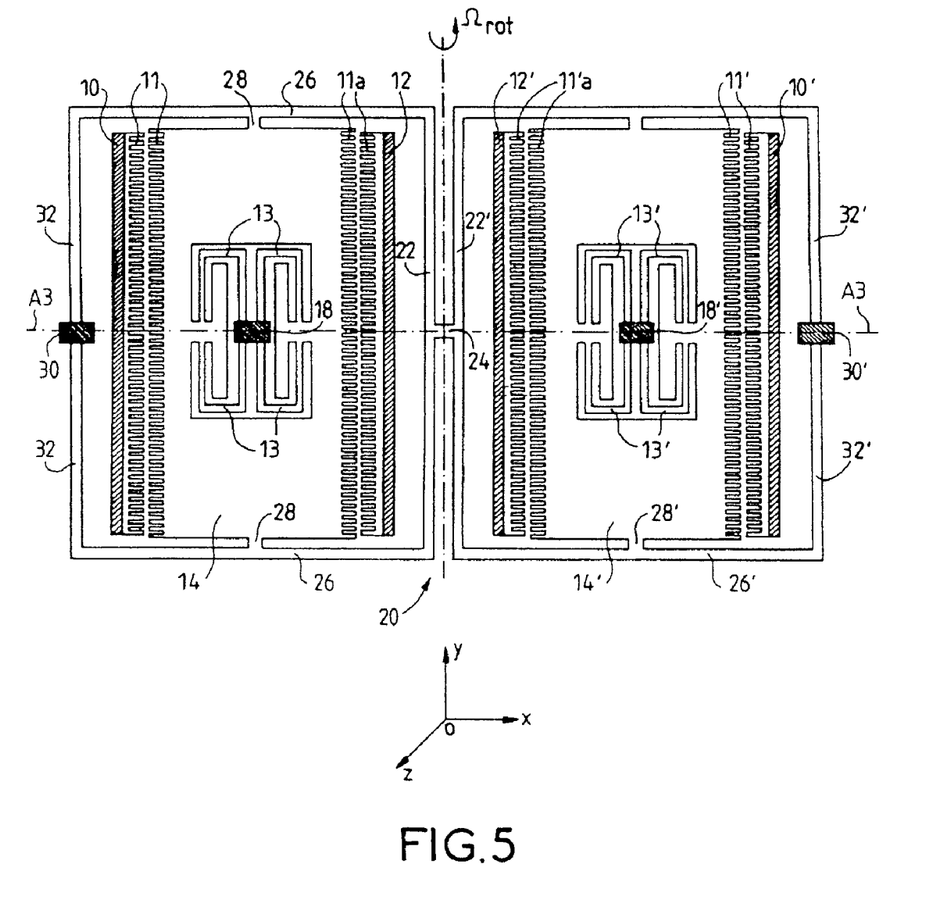
FIG. 5 shows a known variant of the gyrometer structure of FIG. 2.

FIG. 3 shows the fixed substrate 5 seen via its rear face $F_{rear}$, this rear face corresponding to the top view shown in FIG. 5. In this embodiment, the two regions have the shape of arms 8 and 8' for the purpose of partly isolating the anchoring feet from the rest of the fixed substrate. The arms 8 and 8' are connected to the rest of the fixed substrate, in this case the edges, via a central bridge. The axis of the arms 8 and 8' lies along the transverse axis of symmetry A3 since the anchoring feet 18 and 18' on the front face, these being indicated by dotted lines in this figure, lie on this axis A3. The axis of the bridge 9 is that of the axis A1.

Figure 4:
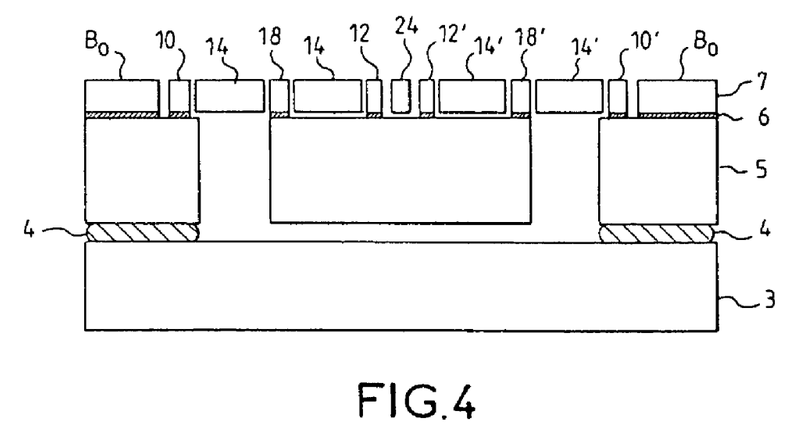
FIG. 4 shows, seen in section, the moving structure of FIG. 2 and the corresponding fixed substrate and third substrate.

FIG. 4 shows the moving structure, the fixed substrate and the third substrate in cross section along the transverse axis of symmetry A3; the third substrate 3 is fastened to the fixed substrate 5 via fastening means 4 applied to the periphery of the fixed substrate 5 along its edges $B_0$.

FIG. 5 shows an alternative embodiment of the previous gyrometer, in which the coupling structure 20 is fastened to two anchoring feet 30 and 30' that are symmetrical with respect to the axis A1. The anchoring feet have the advantage of facilitating a pure vertical translation movement of the moving masses, eliminating a partial rotation effect due to the fact that the masses move in phase opposition with respect to the plane of the figure, that is to say one rises above the plane of the figure while the other descends. This phase opposition is in fact generated by the fact that the masses are excited in phase by the interdigitated combs 11, 11' (that is to say one of the masses is pulled to the right while the other is pulled to the left, since the combs simultaneously exert an attractive force each on its side). This phase opposition of the vibration of the masses perpendicular to the plane is desirable since it allows detection to be carried out directly in differential mode, by eliminating the common mode effects that would be generated if the masses were to move simultaneously on one and the same side of the plane of the structure.

Here again, it should be noted that the anchoring feet have, however, a drawback in that some of the mechanical vibration energy of a mass is transmitted (and therefore lost) to the anchoring foot instead of being transmitted to the other mass.

Preferably, the anchoring feet 30 and 30' lie on the transverse axis of symmetry A3 and are located at points remote from the sensitive axis; these points are preferably beyond the excitation combs 11, 11'. To do this, the coupling structure is formed as in FIG. 2, but the transverse arms 26 extend beyond the longitudinal arms 28 and are closed up around the moving masses by an additional longitudinal link 32 (32' in the case of the other moving mass) which runs along the moving mass on the opposite side from the sensitive axis. The coupling structure, which is symmetrical with respect to the sensitive axis, therefore completely surrounds each moving mass and the linking of the two symmetrical parts of this structure is accomplished, as in FIG. 2, by a short transverse link 24 between the longitudinal links 22 and 22'.

The anchoring foot 30, 30' is located at the middle of the additional longitudinal link 32, 32'.

For this type of gyrometer, the axis of the arms of the fixed substrate that lies on the axis of the anchoring feet is the axis A3.

In a first embodiment of this gyrometer shown in FIG. 5, the arms 8 and 8' of the fixed substrate extend so as to isolate the anchoring feet 18 and 18'. What is obtained, as seen from the rear face of the fixed substrate, is a view corresponding to that of FIG. 4.

Figure 6:
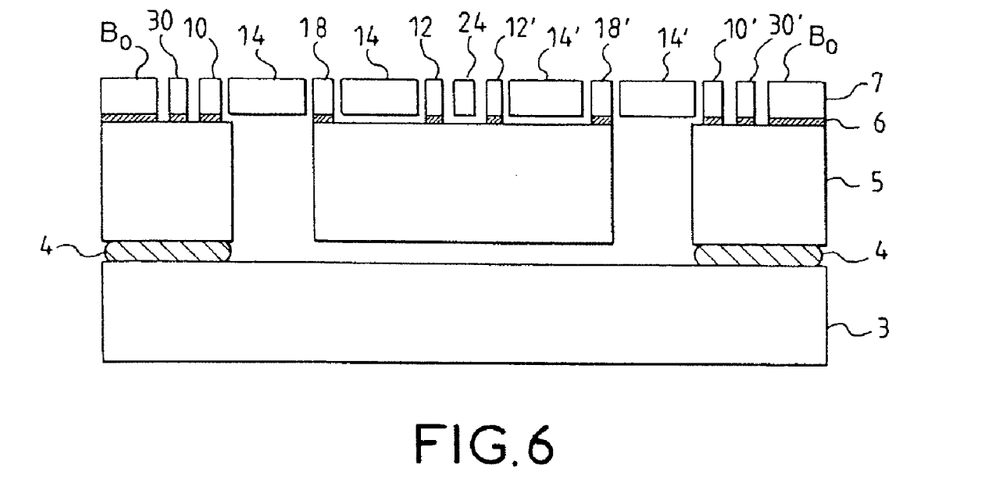
FIG. 6 shows, seen in section, the moving structure of FIG. 5 and the corresponding fixed substrate and third substrate.

FIG. 6 shows the moving structure, the fixed substrate and the third substrate in section on the axis A3. Only the anchoring feet 18 and 18' are isolated from the rest of the fixed substrate, the anchoring feet 30 and 30' of the coupling structure 20 are not isolated. The fixed substrate 5 is mounted on the third substrate 3 (or support substrate) via fastening means 4 applied on the periphery.

In this configuration, only the anchoring feet 18 and 18' are involved in the reduction in energy loss; however, the anchoring feet 30 and 30' of the coupling frame are not decoupled from the substrate 3. However, as the coupling frame is very flexible, these anchoring feet 30 and 30' transmit only very little vibration energy.

Figure 7:
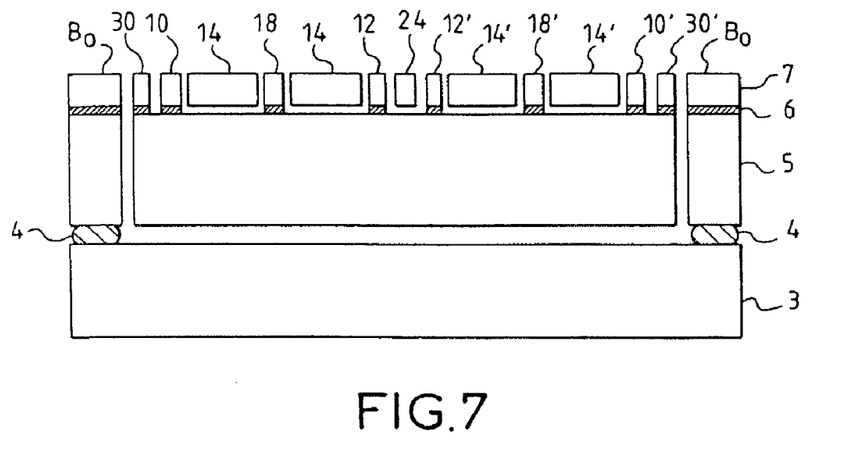
FIG. 7 shows, seen in section, a variant of the invention shown in the preceding figure.
Figure 8:
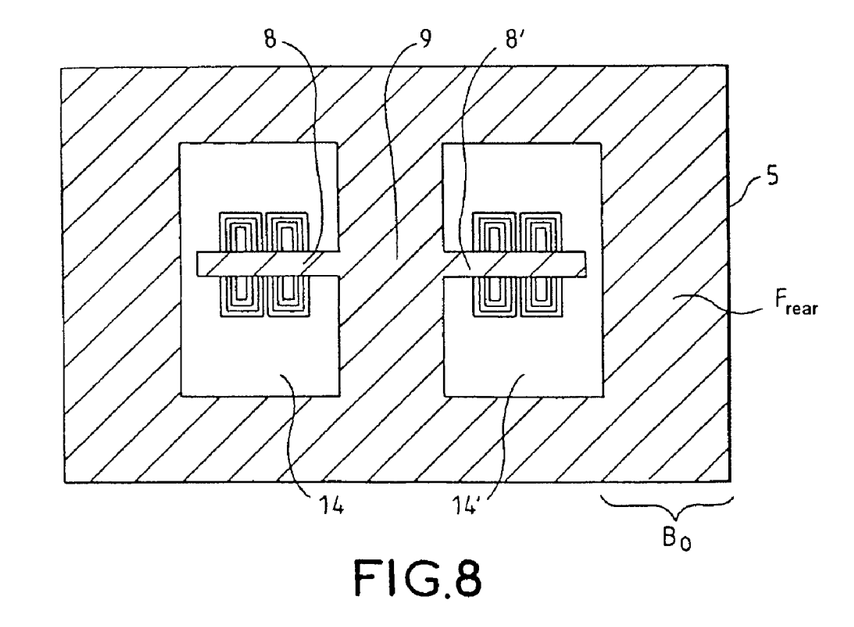
FIG. 8 shows the fixed substrate corresponding to the moving structure of FIG. 5, seen via its rear face $F_{rear}$.

In a variant of this embodiment, shown in FIGS. 7 and 8, the arms 8 and 8' of the fixed substrate are extended in order also to isolate the anchoring feet 30 and 30'.

Both these last embodiments again have the abovementioned advantages, namely a reduction in energy losses passing through the anchoring feet.

More generally, the invention applies to any other gyrometer having a moving structure comprising two moving assemblies that are symmetrical with respect to an axis of symmetry A1 and are coupled via a coupling structure, the moving structuring being anchored to a fixed substrate via anchoring feet located outside the axis of symmetry.

Each moving assembly may include only one moving mass, as described in the previous examples.

It may also comprise several moving elements, for example two moving elements connected together, namely, as first moving element, an inertial frame and, as second moving element, a central moving inertial mass surrounded by the frame. The moving inertial mass, also referred to as the detection mass, can move only in a detection direction, for example along Oy (the vertical axis in the plane of the figure); the inertial frame can move along the Oy axis and along an axis Ox that is perpendicular to Oy and also lies in the plane of the figure. The gyrometer delivers an electrical measurement of the angular rotation velocity of the structure about the Oz axis perpendicular to the plane of the wafer. The inertial frame is excited in vibration in the Ox direction; when the gyrometer rotates about its Oz axis, a vibration of the frame is generated along the Oy axis. This vibration along Oy is transmitted to the mass, whereas the vibration along Ox is not transmitted. Of course, a vibration excitation structure is associated with the frame, and a vibration detection structure is associated with the inertial detection mass.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A micromachined, gyrometer, comprising:
    a planar moving structure anchored on a fixed substrate by anchoring feet, the moving structure having at least two moving assemblies that are symmetrical with respect to an axis of symmetry A1 contained in the plane of the moving structure and are coupled by a coupling structure that connects these two assemblies in order to allow transfer of mechanical vibration energy between the moving assemblies, the anchoring feet being located outside the axis of symmetry A1, wherein the fixed substrate has etched portions and said etched portions partially isolate at least one region of the fixed substrate from the rest of the fixed substrate, the partially isolated region having at least one of said anchoring feet, and the fixed substrate being mounted on a support substrate by fasteners, and said fasteners are located outside said partially isolated region of the fixed substrate so that each of said fasteners are is partially isolated from said at least one of said anchoring feet.

2. The gyrometer as claimed in claim 1, wherein the region furthermore includes a portion of the fixed substrate, lying along the axis A1, the portion being connected to the portion having at least one anchoring foot.

3. The gyrometer as claimed in claim 2, wherein the portion having at least one anchoring foot comprises at least two arms located on either side of the portion lying along the axis A1.

4. The gyrometer as claimed in claim 1, wherein the fasteners are applied to the edges of the fixed substrate.

5. The gyrometer as claimed in claim 1, wherein each moving assembly comprises two moving masses that are attached to flexure arms, an exciting structure for exciting the vibration of each mass in the plane of the moving structure, and a detection structure for detecting a vibration of the masses transversely to the plane.

6. The gyrometer as claimed in claim 5, wherein the flexure arms connected to a moving mass of a moving assembly are also connected to at least one anchoring foot, the coupling structure for coupling between masses being connected directly to the moving masses independently of the flexure arms, the coupling structure comprising at least two longitudinal links extending on either side of a sensitive axis, parallel to the latter, between the moving masses, at least one transverse link connecting the two longitudinal links, and at least two transverse arms connecting each moving mass to a respective longitudinal link, the latter two transverse arms being located on either side of the moving mass and being connected to the moving mass.

7. The gyrometer as claimed in claim 2, wherein the fasteners are applied to the edges of the fixed substrate.

8. The gyrometer as claimed in claim 3, wherein the fasteners are applied to the edges of the fixed substrate.

9. The gyrometer as claimed in claim 2, wherein each moving assembly comprises two moving masses that are attached to flexure arms, an exciting structure for exciting the vibration of each mass in the plane of the moving structure, and a detection structure for detecting a vibration of the masses transversely to the plane.

10. The gyrometer as claimed in claim 3, wherein each moving assembly comprises two moving masses that are attached to flexure arms, an exciting structure for exciting the vibration of each mass in the plane of the moving structure, and a detection structure for detecting a vibration of the masses transversely to the plane.

11. The gyrometer as claimed in claim 4, wherein each moving assembly comprises two moving masses that are attached to flexure arms, an exciting structure for exciting the vibration of each mass in the plane of the moving structure, and a detection structure for detecting a vibration of the masses transversely to the plane.

\* \* \* \* \*